US007600484B2

(12) United States Patent
Claycomb

(10) Patent No.: US 7,600,484 B2
(45) Date of Patent: Oct. 13, 2009

(54) ON-FARM SEPARATION OF MILK COMPONENTS

(75) Inventor: Rodney Wayne Claycomb, Hamilton (NZ)

(73) Assignee: DEC International NZ Limited, Hamilton (NZ)

( * ) Notice: Subject to any disclaimer, the term of this patent is extended or adjusted under 35 U.S.C. 154(b) by 458 days.

(21) Appl. No.: 10/539,424

(22) PCT Filed: Dec. 22, 2003

(86) PCT No.: PCT/NZ03/00292

§ 371 (c)(1),
(2), (4) Date: Dec. 28, 2005

(87) PCT Pub. No.: WO2004/056193

PCT Pub. Date: Jul. 8, 2004

(65) Prior Publication Data

US 2006/0150916 A1 Jul. 13, 2006

(30) Foreign Application Priority Data

Dec. 20, 2002 (NZ) ..................................... 523369

(51) Int. Cl.
*A01J 5/00* (2006.01)
*A01J 7/00* (2006.01)
(52) U.S. Cl. .................. 119/14.02; 119/14.18
(58) Field of Classification Search ............. 119/14.02, 119/14.1, 14.18, 14.46, 14.01
See application file for complete search history.

(56) References Cited

U.S. PATENT DOCUMENTS

| 3,242,903 | A | | 3/1966 | Karnath et al. |
| 3,841,756 | A | | 10/1974 | Grochowicz |
| 3,946,113 | A | | 3/1976 | Seiberling |
| 4,018,752 | A | | 4/1977 | Buhler et al. |
| 4,075,196 | A | | 2/1978 | Badertscher et al. |
| 4,174,721 | A | * | 11/1979 | Wuchse .................... 134/58 R |
| 4,385,590 | A | | 5/1983 | Mortensen |
| 4,970,989 | A | * | 11/1990 | Lidman ................... 119/14.01 |
| 5,722,343 | A | * | 3/1998 | Aurik et al. .............. 119/14.02 |
| 6,098,570 | A | | 8/2000 | Aurik et al. |
| 2003/0226508 | A1 | * | 12/2003 | Theelen ................... 119/14.02 |

FOREIGN PATENT DOCUMENTS

| EP | 1 138 192 B1 | 3/2000 |
| NZ | 280724 | 12/1996 |
| WO | WO 94/08450 | 4/1994 |
| WO | WO 96/01040 | 1/1996 |
| WO | WO 96/11568 | 4/1996 |
| WO | WO 98/28969 | 7/1998 |
| WO | WO 02/074070 A1 | 9/2002 |

* cited by examiner

*Primary Examiner*—Rob Swiatek
(74) *Attorney, Agent, or Firm*—Greer, Burns & Crain, Ltd.

(57) ABSTRACT

A robotic milking system includes a stall wherein dairy animals enter one at a time to be milked automatically. A holding tank receives successive measures of milk from successive dairy animals. Separation devices receive the successive measures of milk from the holding tank to separate components from the milk.

12 Claims, 2 Drawing Sheets

ON-FARM SEPARATION OF MILK COMPONENTS

TECHNICAL FIELD

This invention relates to a method of milk processing. Specifically, this invention relates to the on farm separation of milk components.

BACKGROUND ART

In New Zealand, most dairy animals such as cows are generally milked twice daily, the milk being collected into a main storage vat before being transported in bulk to a milk treatment station.

The milk is then processed into a range of products, including pasteurised milk, powdered milk, butter, cheese or milk derivatives.

The production of butter and cheese results in large volumes of by-products such as whey which can be further processed on-site or transported to another specialist treatment station. A number of components can be fractionated from such milk by-products including carbohydrates, whey protein bioactives such as lactoferrin and so forth.

The standard processing of milk and milk by-products thus results in high transport and handling costs associated with processing such large volumes of milk.

Further, due to the time delay between the collection of milk on-farm and its subsequent processing off site, milk proteins such as bioactives may be subjected to proteolytic degradation by enzymes such as proteases, or may be inactivated or lose activity through a number of other interactions.

The act of transporting and processing the milk may also denature a number of bioactive proteins through the physical handling or heating of the liquid.

To attempt to overcome some of these problems, NZ 280724 disclosed a process for the isolation of endogenous milk proteins by on-farm processing of milk using standard separation techniques such as chromatographic resins.

Such processes were useful in the separation of bioactive proteins in the minimum amount of time, ensuring minimal degradation or loss of activity of the bioactive proteins.

However, while these methods work well in an experimental situation, the volume of milk collected during a standard milking often meant such standard separation techniques were not optimal.

Chromatographic resins are primarily designed to process small volumes of liquid, usually at low flow rates to ensure good component separation. Increasing the flow rate not only reduces the degree of separation but may damage the resin or chromatographic column. As large amounts of resin would be required to cope with normal milking volumes without overloading, these techniques may be prohibitively expensive.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does hot constitute an admission that any of these documents form part of the common general knowledge in the art, in New Zealand or in any other country.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

It is an object of the present invention to address the foregoing problems or at least to provide the public with a useful choice.

Further aspects and advantages of the present invention will become apparent from the ensuing description which is given by way of example only.

DISCLOSURE OF INVENTION

According to one aspect of the present invention there is provided a method for the on-farm separation of at least one component from milk characterised by the steps of
(i) using an automated milking device to extract milk from a dairy animal, and
(ii) passing the milk extracted through a separation device to remove said at least one component from the milk.

According to another aspect of the present invention there is provided a method for the on farm separation of at least one component from the milk of a lactating dairy herd, characterised by the steps of
(i) allowing animals to freely enter a milking system and be milked by an automated milking device, and
(ii) passing the milk through a separation device to remove said at least one component from the milk.

The term "component" should be taken to mean any component present in the milk, such as endogenous milk proteins, fats, enzymes, cells, ions, nucleic acids and so forth.

In one preferred embodiment of the present invention the milk component separated is lactoferrin. However, this is given by way of example only and as such this should be seen as a limitation on the present invention in any way.

The term "automated milking device" should be taken to mean any automated or robotic device designed to milk a dairy animal. A range of automated and robotic milking systems are known in the art and could potentially be used in the present invention. For ease of reference throughout the specification, the automated device will herein be referred to as a robotic milking device, though this should not be seen as a limitation in any way.

The term "milk" should also be taken to include colostrum or milk from late lactation as well as milk from mid lactation or sub-fractions of milk taken during part of a milking.

The term "dairy animal" will herein be referred to as a cow. However, this should also not be seen as a limitation for it is anticipated this method will also be applicable to other milking animals such as goats, sheep and so forth.

The term "separation device" should be taken to mean a device utilising any separation technique known in the art, such as ultrafiltration, chromatographic separation, dialysis and so forth, or a combination of such techniques. Once again, these are given by way of example only and should not be viewed as limiting in any way.

It is anticipated a range of separation techniques could be employed depending on the component of interest and that this would readily be understood by a skilled addressee. For example, chromatographic separation may encompass a range of techniques, including by not limited to ion-exchange, reverse phase or affinity chromatography.

The separation device may be a modular cartridge type unit which incorporates a medium for removing specific milk components. A plurality of different cartridges may be used, whereby milk from a given animal may be passed through a different cartridge to that of another animal.

The term "medium" can be defined as anything which imparts different flow rates on the basis of a compound's physicochemical properties. The medium may be a chromatographic resin, porous bead, gel, viscous solvent, membrane or so forth.

In situations where the separation device is able to separate a number of components substantially simultaneously, the elution of the components from the matrix will preferably also isolate the components from each other.

In some embodiments of the present invention, the milk may be passed through a series or array of cartridges to remove a number of components from milk.

Once the cartridge has processed a given volume of milk, it can be removed and substituted for a fresh cartridge. The removed unit can then be treated to remove the bound milk components, or stored in a refrigerated unit for subsequent collection and/or processing.

Preferably once the components have been eluted from the cartridge, the cartridge can be recharged, available for another separation.

In New Zealand, herds are typically milked twice daily in order to obtain maximum milk yields balanced with labour costs. As such, a large volume of milk is collected from each cow at each milking.

In order to reduce the amount of time taken to milk the entire herd, a large number of individual stalls are often required to allow a number of animals to be milked substantially simultaneously.

Previous on-farm separation methods disclosed by NZ 280724 were able to remove a number of targeted milk components, but while they worked well in experimental situation, the volume of milk required to be processed during standard twice daily milking presents a number of difficulties.

The separation techniques utilised are limited in both the volume and also the rate at which milk can be processed at any one time. As such, this could result in long delays during standard twice daily milking, and require large volumes of chromatographic resins to prevent overloading.

In many situations it is thus desirable for components to be separated before milk enters the bulk milk line. The smaller volume of milk needing to be processed ensures a better degree of component separation in the minimum amount of time, and also reduces the likelihood of the separation device being overloaded.

To be effective however, separation devices thus need to be incorporated into each stall of a milking system, which at present would make them prohibitively expensive for a standard on-farm situation.

The advantage of robotic milking is that cows are milked throughout the day in small numbers, in contrast to the entire herd being milked at substantially the same time. While milking the entire herd together is usually the most time efficient method of milking, it is both labour and resource intensive, not only in the total number of hours worked, but also the time of day the animals must be milked.

By using a robotic milking device, cows are able to be milked at any time of the day. A cow is able to freely enter a milking system a number of times during the day rather than waiting for the twice-daily milking, reducing the volume of milk taken from the cow at each milking and thus the amount needing to be processed at any one time.

Further, as the whole herd is not being milked at once, only a limited number of stalls and separation devices may be required.

As the milking of the herd is thus staggered throughout the day, there is sufficient time to process each volume of milk and recharge the separation device before the next milking occurs. Alternatively, two or more separation devices could be installed, allowing one device to process a sample while the next animal is milking.

As only small volumes of resin may be required, the cost of such separation techniques become accessible to on-farm situations.

Further, as an operator is not required to be present at all times, there may be considerable savings in labour costs.

Robotic milking also allows individual udder sections to be milked. For example, lactoferrin is known to be produced in high levels in mastitic milk. As such, milk from a mastitic udder quarter could be passed through a separation device to remove the lactoferrin and/or contaminants such as somatic cells or antibiotics, allowing the remaining milk to be diverted back into the main milk flow or alternatively be directed to waste.

As small volumes of milk at low flow rates are produced at any one time, more specialised extraction and fractionation systems may be used, improving the quantity and purity of the milk components separated.

Robotic milking also allows a mixed herd of cows to be milked at once, whereby milk from cows known to produce high levels of lactoferrin may be processed through a separation device, while the milk from cows with low levels of lactoferrin can be collected direct to the main milk storage vat.

Animals may be identified by usual indicia, or alternatively by way of an electronic identifier or chip.

In addition to separating endogenous bioactive components from milk, the method of the present invention will also be able to remove components unacceptable in milk. These include somatic cells, antibiotics, hormones and so forth. Currently if milk is found to be contaminated with these components it is dumped, with the farmer being required to pay substantial penalties.

The present invention can also be used to remove endogenous milk components from bovine milk (such as beta-lactoglobulin and lactose) to make such milk acceptable to consumers with allergies to dairy products.

Another application of the present invention includes the processing of milk from transgenic animals which produce a specific protein in their milk. As the protein of interest is known, a specific separation device or protocol could be designed to isolate the protein of interest, without altering the standard milk composition.

Early removal of bioactive milk components minimises the degradation of these components and any loss of activity that usually occurs during standard milk processing procedures. Further, immediately isolating the compounds of interest reduces the amount of time the components may be subjected to enzymatic or microbial degradation whilst being stored.

The present invention also encompasses separation devices, automated milking devices and milking systems configured for use in the on-farm separation of milk components.

BRIEF DESCRIPTION OF DRAWINGS

Further aspects of the present invention will become apparent from the following description which is given by way of example only and with reference to the accompanying drawings in which.

DETAILED DESCRIPTION OF THE INVENTION

Figure 1:
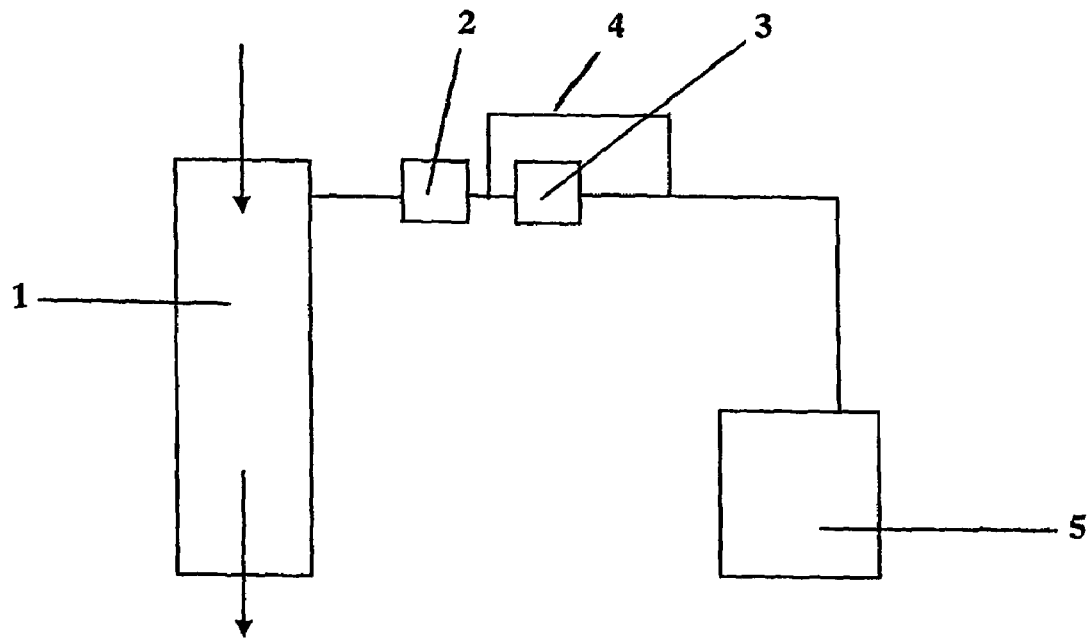
FIG. 1 shows a diagrammatic layout of milk flow into and out of a robotic milking stall in accordance with one preferred embodiment of the present invention.

As defined above, the present invention has sought ways to improve the on-farm separation of milk components by utilising automated milking technology.

Non-limiting examples of the invention will now be provided.

A trial for on-line capture of lactoferrin and lactoperoxidase from raw whole milk was conducted as part of an on-line fractionation project using an automatic milking system.

Method

Milk from an individual cow was diverted via a valve into a holding bucket (similar to a milk holding can). Approximately 600 mL of swelled active resin, SP Sepharose™ Big Beads (Amersham Biosciences, Uppsala, Sweden) was present in the bucket. This was manually mixed for 10 minutes to allow for adsorption of the target proteins. After 10 minutes the milk was passed at 1 L/min through a 20 μm fluted filter cartridge in a transparent housing AP11T (Aqua-Pure, Filtration Technology, East Tamaki, Auckland).

The capture of milk target milk proteins (lactoferrin and lactoperoxidase) was undertaken at the Greenfields site of Dexcel Limited. A Fullwood Merlin Milking Robot (Fullwood Limited, Shropshire, England) with fully automated control and data management system, and traffic control (Fusion Electronics, Diksmuide B-8600, Belgium) was used.

The resin with captured proteins was transferred to the laboratory for further processing.

Retrieval of Captured Protein

The retrieval of captured protein was performed using batch processing of the resin in the laboratory using 8 L of 10 mM phosphate buffer solution in 3 steps of 1×5 L and 1×2 L and 1×1 L steps. This was followed by 2×1 L washes with 0.1 M NaCl in phosphate buffer solution.

The elution of the adsorbed proteins was performed using s steps consisting of 1×1 L of 0.25 M NaCl in phosphate buffer followed by 1×1 L of 0.8 M NaCl in phosphate buffer solution.

The resin was subjected to further clean up steps using 1×0.5 L of 1.0 M NaCl, 1×0.5 L of 1.0 M NaOH, followed by 2×1 L washes with Milli-Q water, 2×0.5 L buffer before being stored in 20% ethanol.

Resin Preparation

The resin was supplied as a swelled resin in 0.2 M sodium acetate and 20% ethanol. The resin was equilibrated to a pH of 6.7 using phosphate buffer.

Chemicals and Buffers

Buffer: 10 mM mono and dibasic sodium phosphate (equilibration buffer)
1.0 M NaCl solution (elution buffer)
1.0 M NaOH solution (cleaning and regeneration of resin).
Step Elution Buffers
Step 1) Buffer+0.25 M NaCl
Step 2) Buffer+0.8 M NaCl Samples Samples for raw whole milk (feed in) and processed milk (outflow) were analysed for pH, fat, protein, lactose, total solids (FT120), lactoperoxidase activity and lactoferrin and lactoperoxidase (HPLC).

Results

A total of 8.1 litre of milk was processed. The milk pH at the time of processing was 6.88. The initial temperature of the milk was 37° C. which dropped to 32° C. after processing.

FT120 (Fourier Transform Infrared) analyses completed by Dexcel milk laboratories gave the milk composition percentages: fat, 4.53; total protein, 3.67; casein, 2.73; lactose, 4.45 and total solids, 13.47.

The lactoperoxidase concentration (mg/mL) as calculated activity, using the ABTS assay is summarised in Table 1 below.

TABLE 1

Lactoperoxidase concentration in feed and elutes measured by the ABTS activity assay

| Sample | Concentration mg/mL | Purity ($\times 10^{-5}$) | Recovery of lactoperoxidase (%) |
|---|---|---|---|
| Milk (feed in) | $6.4 \times 10^{-4}$ | 1.75 | — |
| Elute 1 (0.25 M NaCl) | $7.2 \times 10^{-4}$ | 1.96 | 13.8 |
| Elute 2 (0.8 M NaCl) | $3.2 \times 10^{-3}$ | 8.72 | 61.5 |

The recovery of lactoperoxidase as calculated from elute 1 and 2 was 75.3% from 8.1 litres of milk.

The purity was calculated by the following expression:

$$\text{Purity} = \frac{\text{mg of protein (lactoperoxidase)}}{\text{mg of total protein}}$$

Analyses were also undertaken to quantify the lactoferrin and lactoperoxidase concentration in feed and elutes. Fast protein liquid chromatography (FPLC) analyses of samples for lactoperoxidase and lactoferrin using 5 mL HiTrap desalting column and 1 mL Resource S column.

Total protein in milk and elutes were calculated using BCA protein assay kit (Novagen, Wis., U.S.A.). Table 2 summarised results, which have been used to calculate the protein purification achieved.

TABLE 2

| Sample factor | Lp & Lf (mg/mL) | Total Lp & Lf (mg) | Total protein[1] (mg/mL) | Purity[2] | Purification |
|---|---|---|---|---|---|
| Milk (feed in) | 0.14 | 1119.4 | 36.4 | 0.0038 | 1.0 |

TABLE 2-continued

| Sample factor | Lp & Lf (mg/mL) | Total Lp & Lf (mg) | Total protein[1] (mg/mL) | Purity[2] | Purification |
|---|---|---|---|---|---|
| Elute 1 (0.25 M NaCl) | 0.34 | 338.1 | 0.343 | 0.9911 | 261 |
| Elute 2 (0.8 M NaCl) | 0.38 | 380.0 | 0.424 | 0.8952 | 236 |

[1]Total protein includes the concentration of all protein in a given sample type.
[2]Purity is reported to 4 decimal places since the purity of lactoferrin and lactoperoxidase was much lower in milk as compared to the eluted fractions.

$$\text{Purification factor} = \frac{\text{purity in elute}}{\text{Purity in feed (milk)}}$$

The yield or recovery of lactoferrin and lactoperoxidase was 64%

Lactoperoxidase Assay (ABTS)

Aim: To measure lactoperoxidase activity using ABTS substrate.

Reagents

ABTS diammonium salt (2,2'-azino-bis(3-ethylybenzthiazoline-6-sulfonic acid)

10 mM $NaH_2PO_4/Na_2HPO_4$ for sample buffer and dilution of samples 100 mM $NaH_2PO_4/Na_2HPO_4$ for reaction mixture Reaction Mixture Solutions Note reaction mixture solutions are prepared in 100 mM phosphate buffer.

0.5 M ABTS (0.22 g/8 mL phosphate buffer)

3 mM H2O2 (4 uL $H_2O_2$/13.03 mL phosphate buffer)

1 mg/mL Lactoperoxidase standard (serial dilutions performed on this with 100 mM phosphate buffer to get absorbance reading between 0.5 and 1.0 delta Abs to achieve best calculation of comparative IU/mL).

Reaction Mixture

| A | 750 uL phosphate buffer (100 mM phosphate) |
| B | 100 uL ABTS (50 mM or 0.5 M) |
| C | 100 uL of 3 mM H2O2 |

Eg ratio: 7.5 A, 1.0 B, 1.0 C.

Sample Analyses

Add 950 uL of reaction mixture to a cuvette, set UV reference, and then add 50 uL of sample.

UV Measurements

Parameters

UV-delta data (measures changes in absorbance)

Wavelength=436 nm

Delay 5 s

Sampling interval 30 s

Duration 160 s

Factor 1

Measure changes every 30 seconds for 2.5 minutes. (The most stable values are averaged to achieve a Δ Abs value).

Absorbance readings in the range of 0.5 and 1.0 give the best reflection of activity range, or the activity could be too fast or too slow to give accurate reading and reflection of activity.

Calculations

Specific activity $(SA) = IU$ activity/(mg/mL)

$$IU/mL = \frac{\Delta Abs}{\varepsilon} \times df \frac{\text{total volume of mixture}}{\text{assay volume}}$$

$\varepsilon$ Extension coefficient for ABTS is 29.3
df dilution factor
Total reaction volume=1000 uL (750+100+100+50)
Results for absorbance specific activity calculation for lactoperoxidase

| (Sigma product # L 8257) | | | |
|---|---|---|---|
| ΔAbs | concentration (mg/mL) | Dilutions | IU |
| 0.104 | 0.10 | 1:10 | 70.98 |
| 2.816 | 0.01 | 1:100 | 149.20 |
| 1.274 | 0.067 | 1:150 | 130.44 |

The 100 and 150× dilutions yield stable changes in absorbances and were within the activity range on UV. Therefore the activity calculated from the average of these two dilutions is 140.

(Sigma activity given as 80-150 units).

FIG. 1 shows the milk-flow into and out of a robotic milking stall (1). The milk is transferred from the cow (not shown) to a holding vessel (2), then either pumped out of the holding vessel (2) through to the separation device (3) or bypassed (4) around the separation device (3). Then, the milk is transferred to a bulk holding tank (5), whilst the separated fraction is retained at the separation device (3).

Figure 2:
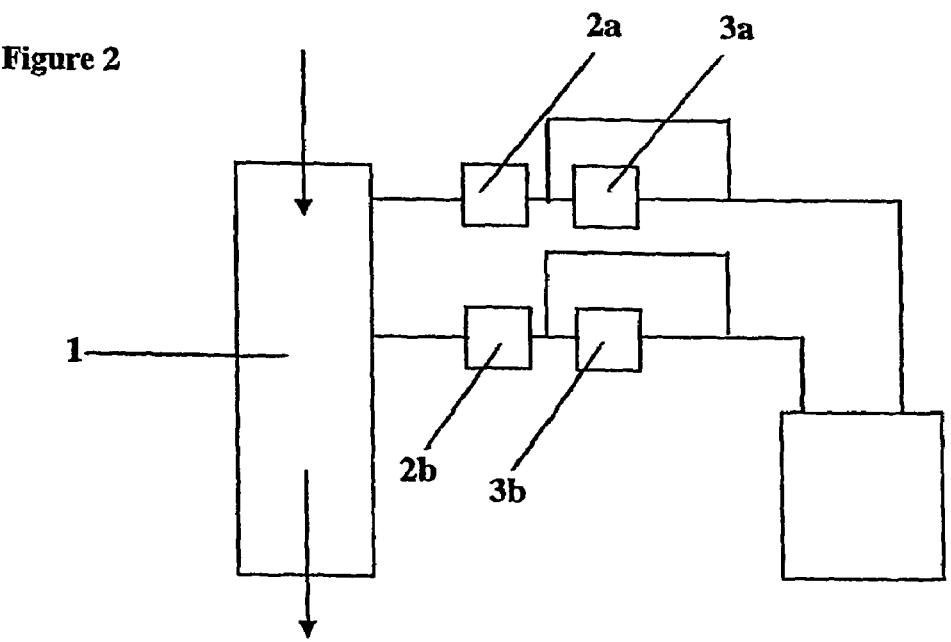
FIG. 2 shows a diagrammatic layout of milk flow in accordance with another preferred embodiment of the present invention.

FIG. 2 shows a schematic layout of a robotic milking stall (1) with two collection (2a and 2b) and separation devices (3a and 3b), whereby one device (2a and 3a) can be operating whilst the second (2b and 3b) is collecting milk from the next animal. This would be in the interest of higher throughput. Alternatively, each device could place the first milk from one animal into one collection/separation unit (2a and 3a) and then later milk portions from the same animal into the other (2b and 3b). This could be useful for components that are higher in the later portions, such as lactoferrin. Alternatively, this device could place milk from one or more udder teats into different collection/separation units. This could be useful for components that are higher in one quarter, such as a quarter having mastitis and, therefore, higher immunoglobulins.

Figure 3:
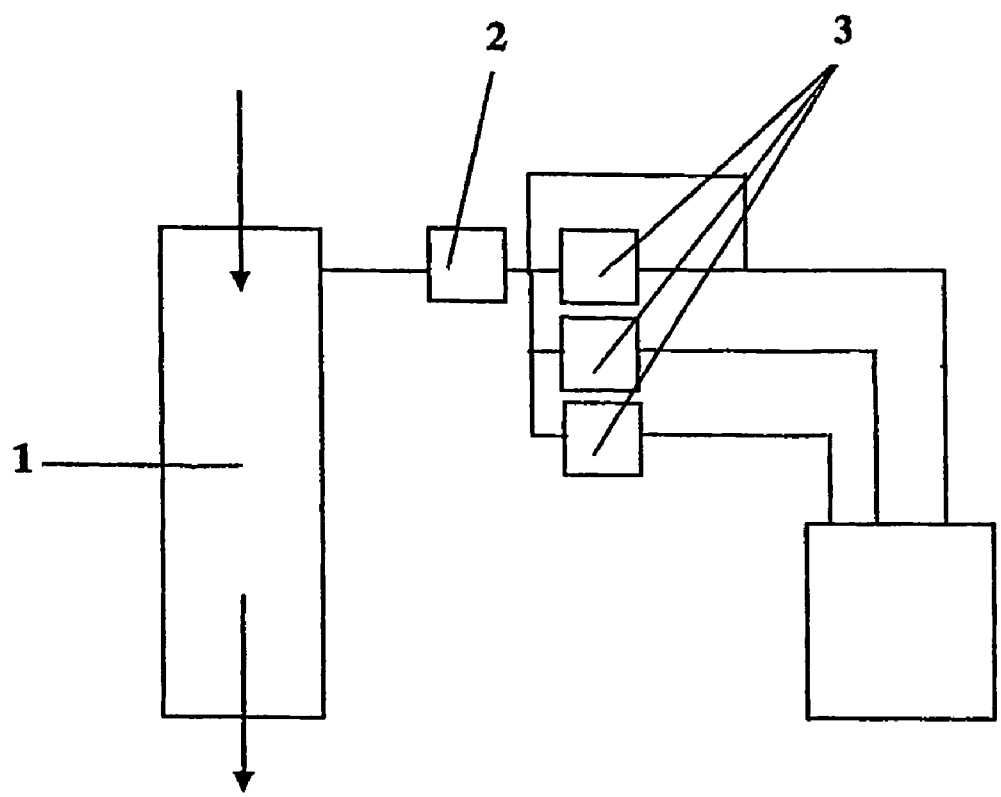
FIG. 3 shows a diagrammatic layout of milk flow in accordance with a third preferred embodiment of the present invention.

Another variation on FIG. 1 could be multiple separation devices (3), useful for separating multiple components from the same animal's milk, as shown by FIG. 3.

Aspects of the present invention have been described by way of example only and it should be appreciated that modifications and additions may be made thereto without departing from the scope of the appended claims.

What I claim is:

1. An apparatus for on-farm separation of at least one milk component from milk, the apparatus comprising:

(i) a robotic milking device having a stall for milking a dairy animal and which is adapted to allow one dairy animal to freely enter at any time;

(ii) a first holding vessel connected to the stall for receiving successive measures of milk from successive dairy animals;

(iii) at least one first separation device connected to said first holding vessel for receiving the successive measures of milk and separating each measure of milk into at least one refined milk component according to at least one physicochemical property of the component and a residual milk measure, and (iv) a bulk tank connected to each separation device for accumulating the successive residual milk measures.

2. The apparatus of claim 1 wherein said at least one first separation device is configured to enable substitution or replacement of cartridges.

3. The apparatus of claim 1 wherein said at least one first separation device is configured to enable the cleaning or elution of cartridges.

4. A method for on-farm separation of at least one milk component from the milk produced by a plurality of dairy animals, comprising the steps of:

(i) extracting a measure of milk from one of said dairy animals in a stall of a robotic milking device adapted to allow one dairy animal to freely enter at any time;

(ii) passing said measure of milk to a holding vessel feeding at least one separation device;

(iii) operating said at least one separation device to separate said measure of milk into at least one refined milk component according to at least one physicochemical property of the component and a residual milk measure; and (iv) repeating steps (i) to (iii) in turn for each of said plurality of dairy animals.

5. The method of claim 4 wherein the at least one refined milk component separated by the method is lactoferrin.

6. The method of claim 4 wherein the dairy animal is a cow.

7. The method of claim 4 wherein said at least one separation device performs ultrafiltration.

8. The method of claim 4 wherein said at least one separation device performs chromatographic separation.

9. The method of claim 4 wherein said at least one separation device performs dialysis.

10. An apparatus for on-farm separation of at least one milk component from milk, the apparatus comprising:

(i) a robotic milking device having a stall for milking a dairy animal and which is adapted to allow one dairy animal to freely enter at any time;

(ii) a first holding vessel connected to the stall for receiving successive measures of milk from successive dairy animals;

(iii) at least one first separation device connected to said first holding vessel for receiving the successive measures of milk and separating each measure of milk into said at least one milk component and a residual milk measure;

(iv) a bulk tank connected to each separation device for accumulating the successive residual milk measures;

(v) a second holding vessel connected to said stall for receiving successive measures of milk from respective dairy animals in alternation with the first holding vessel;

(vi) at least one second separation device connected to said second holding vessel for receiving the respective measures of milk and separating each measure of milk into said at least one milk component and a residual milk measure; and (vii) a conduit for passing residual milk measures from the second separation device to the bulk tank.

11. The apparatus of claim 10 wherein at least one of said separation devices is a modular cartridge unit incorporating a matrix for removing at least one specific milk component.

12. A method for on-farm separation of milk components from the milk produced by first, second and third dairy animals sequentially milked using the apparatus of claim 10, comprising the steps of:

(viii) extracting a first measure of milk from the first dairy animal in said stall;

(ix) passing said first measure of milk to said first holding vessel;

(x) operating said at least one first separation device to empty the first holding vessel and to separate said first measure of milk into at least one first milk component and a first residual milk measure, while extracting a second measure of milk from the second dairy animal in said stall and passing said second measure of milk to the second holding vessel; and (xi) operating said at least one second separation device to empty the second holding vessel and to separate said second measure of milk into at least one second milk component and a second residual milk measure, while extracting a third measure of milk from the third dairy animal in said stall and passing said third measure of milk to the first holding vessel.

* * * * *